April 15, 1947.　　　G. R. STEWART　　　2,419,041
FILM DATA PROJECTION DEVICE
Filed Feb. 17, 1944　　　3 Sheets-Sheet 1
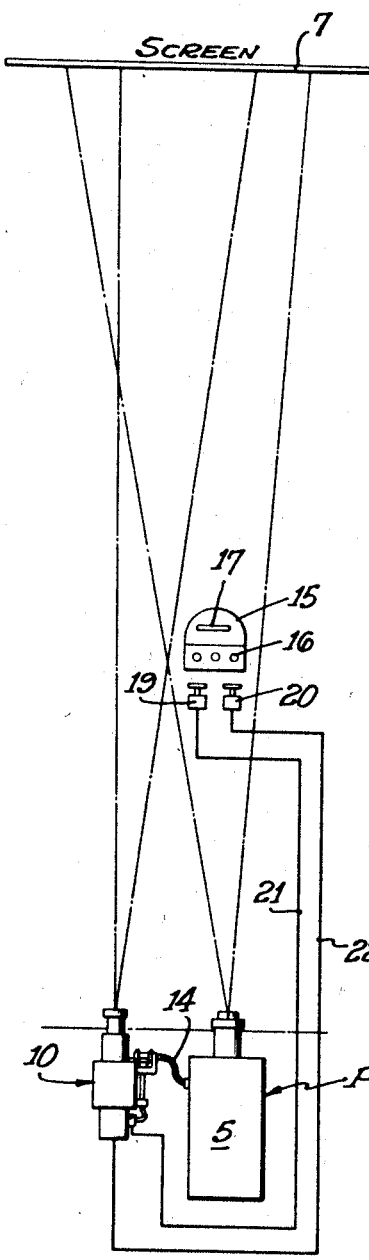
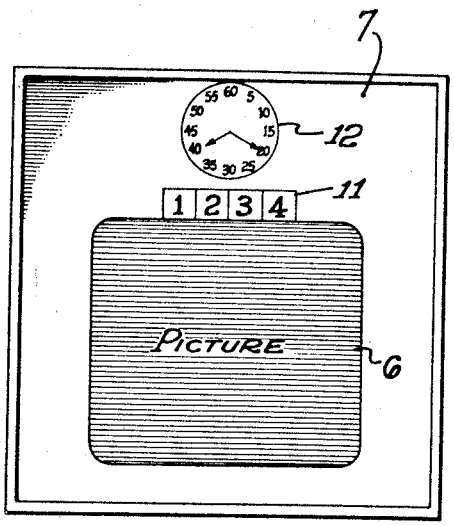
George R. Stewart,
INVENTOR.
BY
Attorney.

April 15, 1947.                    G. R. STEWART                    2,419,041
                              FILM DATA PROJECTION DEVICE
                              Filed Feb. 17, 1944         3 Sheets-Sheet 2
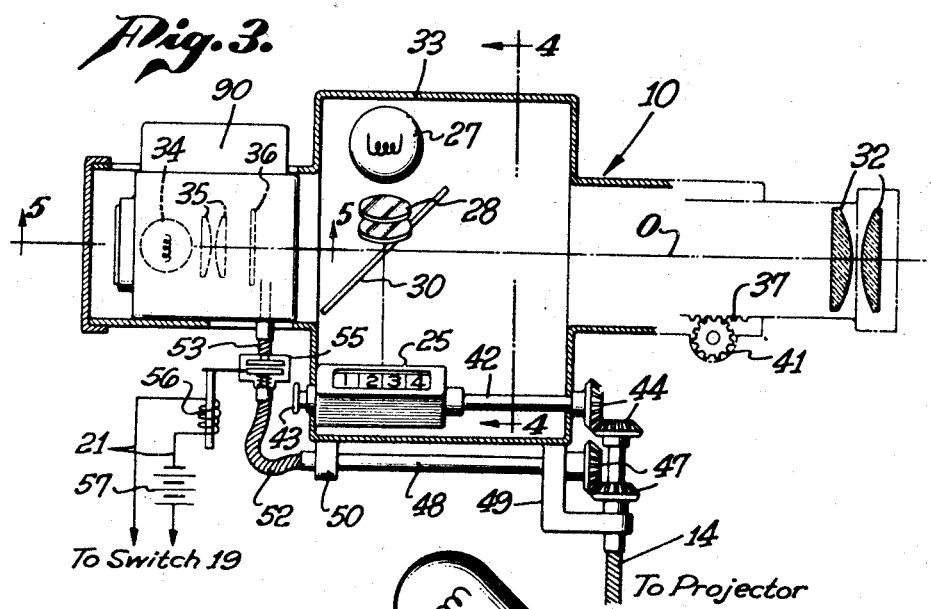
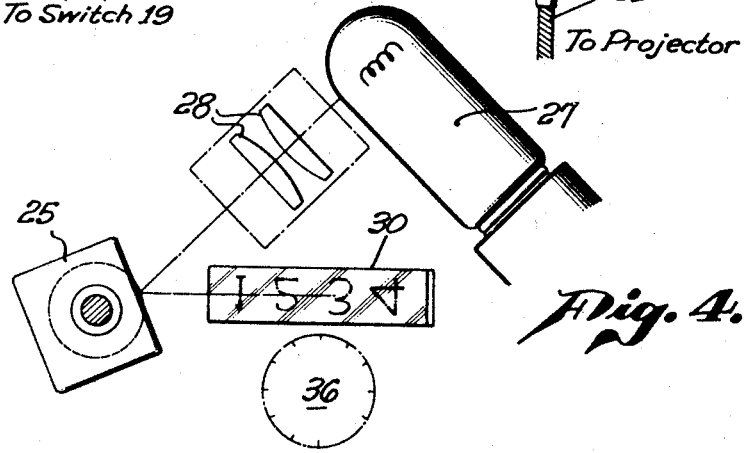
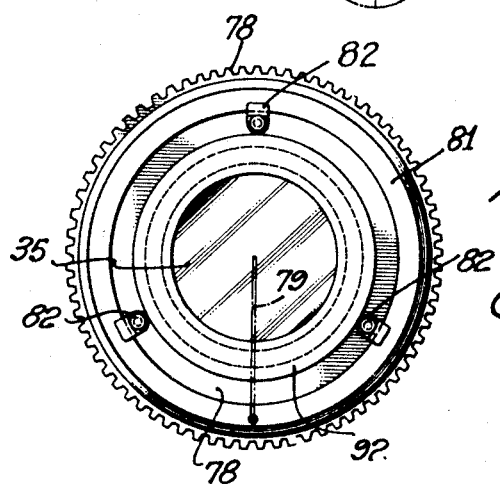
GEORGE R. STEWART,
INVENTOR.
BY
ATTORNEY.

April 15, 1947.   G. R. STEWART   2,419,041
FILM DATA PROJECTION DEVICE
Filed Feb. 17, 1944   3 Sheets-Sheet 3

GEORGE R. STEWART,
INVENTOR.

BY
ATTORNEY.

Patented Apr. 15, 1947

2,419,041

UNITED STATES PATENT OFFICE 2,419,041

FILM DATA PROJECTION DEVICE

George R. Stewart, Los Angeles, Calif.

Application February 17, 1944, Serial No. 522,734

10 Claims. (Cl. 88—16)

This invention relates to motion picture sound systems and particularly to that portion of motion picture production known as sound rerecording whereby one or more films are reproduced simultaneously for combination into a final sound record for use on the motion picture release prints. It may also be used during the original recording of a sound record.

The rerecording process is well-known in the production of sound motion pictures. The primary sound record of any sound picture is the dialogue track, which is usually recorded separately from the photographing of the picture sequences. Separate and special sound records may be made for the subsequent combination of the sounds thereon with the dialogue, while previously recorded sound tracks of crowd noises, hoof beats, background music, and the like, may be also combined with the dialogue track. The background sound tracks are generally in the form of loops which run continuously through respective sound reproducers, while certain other special sound effects may be on film in the form of rolls similar to the dialogue track and which must, therefore, be advanced and reproduced in synchronism therewith.

As these various sound tracks are reproduced, the beginning and end of the reproduction of each track, and the amplitude of the reproduction of each record with respect to the amplitudes of the other records, are controlled by a sound mixer who views the picture as it is projected simultaneously with the reproduction of the sound records. The mixer introduces and eliminates the various background sounds and varies their relative amplitudes in accordance with the nature of each picture sequence. The mixer is generally guided by cues which are given him by the director or film editor of the picture, these cues indicating the beginning and end of each sequence by footage numbers obtained from the film. The mixer also frequently makes his own cues during rehearsals. Sometimes these cues are indicated by the length of time required for a particular sequence to be projected. From these cues, the mixer is able to anticipate the point of introduction and elimination of background sounds and the points where the amplitude of one sound should be increased or decreased with respect to the others.

Furthermore, during rehearsals it is necessary to note the point in the dialogue track reel at which modifications or corrections are to be made, such as the elimination of scratches or other variations in the track which introduce deleterious noises, or the reduction of sibilants by inking them over on the original sound track to increase the average density of the track. Points on other of the sound tracks being reproduced where insertions are to be made or certain portions are to be deleted may be also noted.

The present invention, therefore, is a method of and system for aiding the mixer to know the exact point in the picture being reproduced at any instant either by the number of feet of film having passed through the projector, or in the form of the elapsed time of passage of any length of film sequence through the projector. The invention provides these indications at an observation point which requires no physical act on the part of the mixer, and which point in fact can be observed by the mixer while he views the picture being projected. If any particular film is to be modified at a certain point, the footage is noted by the mixer so that this point may be quickly located by the reproducer operators during inspection of the reels.

The principal object of the invention, therefore, is to facilitate the mixing of a plurality of sound records into a composite record.

Another object of the invention is to provide an improved method of indicating film lengths and/or elapsed time intervals during the mixing of sounds from one or more sound records into a composite record.

A further object of the invention is to provide an indication to a mixer during the reproduction of one or more sound records of the exact film footage which has been advanced through the sound recorder or recorders, or through a picture projector at the most convenient observation point for the mixer.

A further object of the invention is to provide a system for indicating to a mixer the elapsed time of projection of any particular sequence or sequences during the projection of the picture.

A further object of the invention is to simultaneously provide an indication of the length of any sound sequence by footage and elapsed time during the recording of the sequence.

A further object of the invention is to provide a time measuring system under control of the operator to indicate the elapsed time of one or more sequences.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a diagrammatic view of a portion of a rerecording system embodying the invention.

Fig. 2 is a front view showing the observation medium of the invention.

Fig. 3 is a combination diagrammatic and cross-sectional view of the projection portion of the invention.

Fig. 4 is a partial elevational view taken along the line 4—4 of Fig. 3.

Fig. 7 is a detailed view of one of the hand driving gears of the invention.

Figure 5:
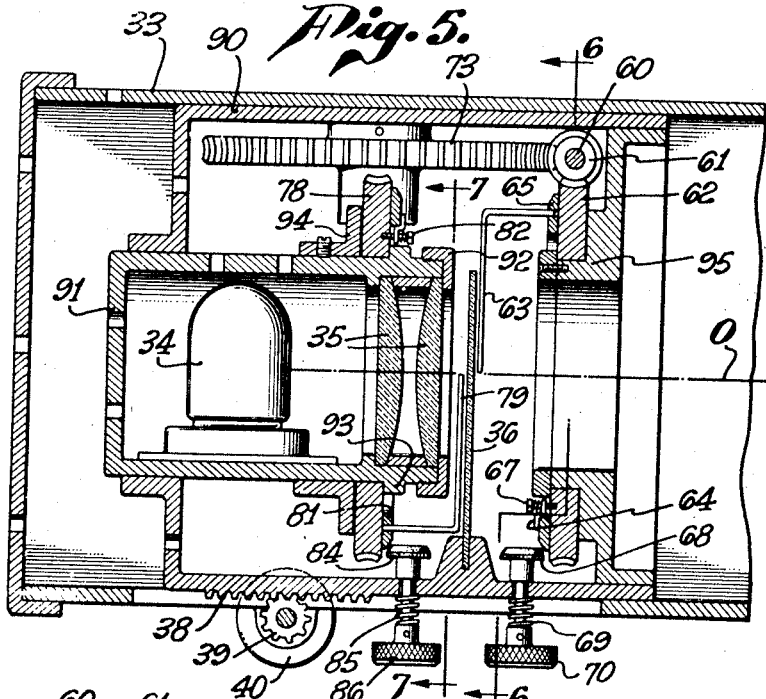
Fig. 5 is a cross-sectional view of a portion of the invention taken along the line 5—5 of Fig. 4.

Referring now to Figs. 1 and 2, a motion picture projector 5 is shown for projecting a motion picture film to the area 6 of a screen 7. Positioned along side of the projector 5 is a second projector 10 for projecting measuring indicia 11 and timing indicia 12 to the screen 7, the measuring and timing indicia being driven in any suitable manner, such as by a flexible shaft 14 between the projector 5 and the projector 10. The area 6 may be the picture portion of the screen, while separate smaller portions may be used for the indicia 11 and 12. Positioned between the projectors 5 and 10 and the screen 7 is a mixing console 15 having the usual volume potentiometer controls 16 and volume indicator 17. Positioned near the console so as to be easily accessible to the mixer's foot are two switches 19 and 20 connected by respective conductors 21 and 22 to the projector 10. As explained more fully hereinafter, these switches are for the purpose of connecting and disconnecting the timing mechanism to its drive shaft and for resetting the timing mechanism to zero. It is to be understood, however, that the switches 19 and 20 may be mounted on the console adjacent the potentiometer controls 16, but the preferred location is near the mixer's feet, so that they can be operated thereby leaving the mixer's hands free for the adjustment of potentiometer controls 16.

From the above general description, it is realized that starting from the zero position of the measuring counter this counter will provide an indication of the length of film through both picture projector and sound recorders, since the films in all units are advanced at the same speed. With the timing mechanism also connected from the beginning of projection, the time required for the projection of the film is also simultaneously provided. It will be noted that the projection of the footage counter is immediately above the picture so that it is unnecessary for the mixer to move his head for the purpose of noting the footage. In fact, the footage counter is actually under observation at the same time as the picture. Thus, if the cues call for a certain sequence to begin at 200 feet, the mixer will be aware of the approach of the beginning of this sequence in both the projector and sound reproducers.

It is also to be noted that the clock indicia are projected immediately above the footage indications and are thus also readily observable. In operating the timing portion of the invention, the mixer may let the clock mechanism operate continuously with the footage counter or he may operate it periodically to determine the time of projection of a single sequence or the total elapsed time of a number of related sequences. By knowing the point in the film footage where any particular sequence is to appear, he can anticipate it and actuate switch 19 accordingly. Although the switch 19 may be so connected as to either start or stop the timer upon actuation of the switch, it is preferred that actuation of the switch stop the timer to provide more freedom of action for the mixer or musical director in the case of recording original sound records. Thus, there is made available a system whereby during the projection of the picture, the length of any film sequence can be indicated by footage or by elapsed time. It is realized that since the film is advanced at a constant speed, there is a direct relationship between footage and time, but the playing time of certain sequences is frequently preferred to permit the mixer or director to balance the various sequences with respect to one another.

The details of a footage counter and resetting circuit are disclosed and claimed in U. S. Patent No. 2,338,014 of December 28, 1943, which could be used for resetting the timer of the present invention if desired. When using the resetting motor of this patent, the switch 20 would control it. This resetting circuit may also be used to reset the footage counter from the console, the counter of the present invention, however, being reset to zero by hand. In the event that a certain point is to be inspected or modified, it is only necessary for the mixer to note the point on the footage counter, this point then being located from the film footage numbers.

To explain the details of the mechanism for performing the above operations, reference is now made to the remaining figures wherein the same numerals identify like elements. Referring particularly to Fig. 3, the usual type of footage counter is shown at 25, it being understood that the numerals are reversed and inverted in order that the indicia appear in their proper position on the screen after reflection by a mirror and passage through the lenses. The mirror is for the purpose of reversing the numerals endwise so a standard operating counter may be used. The indicia of the footage counter 25 are illuminated by light from a lamp 27 energized in any suitable manner, the light rays passing through condenser lenses 28. The light from the counter indicia is reflected by a rectangular mirror 30 to objective lenses 32 mounted for adjustment along their optical axis "O" by a rack 37 and pinion 41 combination. By adjustment of the lenses 32, the numerals of the footage counter 25 are focused on the screen at 11. (See Fig. 2.) It will be noted from Fig. 4 that the lamp 27 and condenser lenses 28 are positioned at an angle above the optical axis, all of these elements being mounted in a housing 33 with its right end open and its left end closed, except for air vents. A hand knob 43 is provided at the end of the counter 25 for manually resetting it to zero.

Positioned to the left of the mirror 30 is the timing mechanism unit mounted in an adjustable housing 90, which unit includes a lamp 34, condensing lenses 35, and timing dial 36 shown in dotted lines in Fig. 3 to indicate their relative position with respect to the footage projection elements. This entire unit is adjustable along the optical axis "O" by a rack 38 and a pinion 39 under control of a hand knob 40 (see Fig. 5) to focus the dial on the screen simultaneously with the indicia on the counter 25. That is, in order for both the indicia of counter 25 and the indicia on dial 36 to be in focus on the screen through the projecting lenses 32, the optical path from the mirror to the indicia must be the same in length as the path from the mirror to the dial 36. It will be noted in Fig. 4 that the mirror 30 is in a position to permit the light rays which form the image of the dial 36 to pass below it to the objective lenses 32.

The footage counter is advanced by a shaft 42, rotated by a pair of bevel gears 44, the driving gear being rotated by the flexible shaft 14 connected to the picture projector. A second pair of beveled gears 47 are provided to rotate a shaft 48, mounted in L shaped bearing bracket 49, and bearing 50, and which is connected to a flexible shaft 52. Between the flexible shaft 52 and a second flexible shaft 53 connected to the timing mechanism, is a clutch 55 under control of a magnetic solenoid 56 and adapted to be energized from a battery 57 over the conductors 21 shown in Fig. 1. Thus, when the projector is started, the footage counter is simultaneously actuated along with the timing mechanism unless the mixer has closed switch 19 which disconnects the clutch 55.

Figure 6:
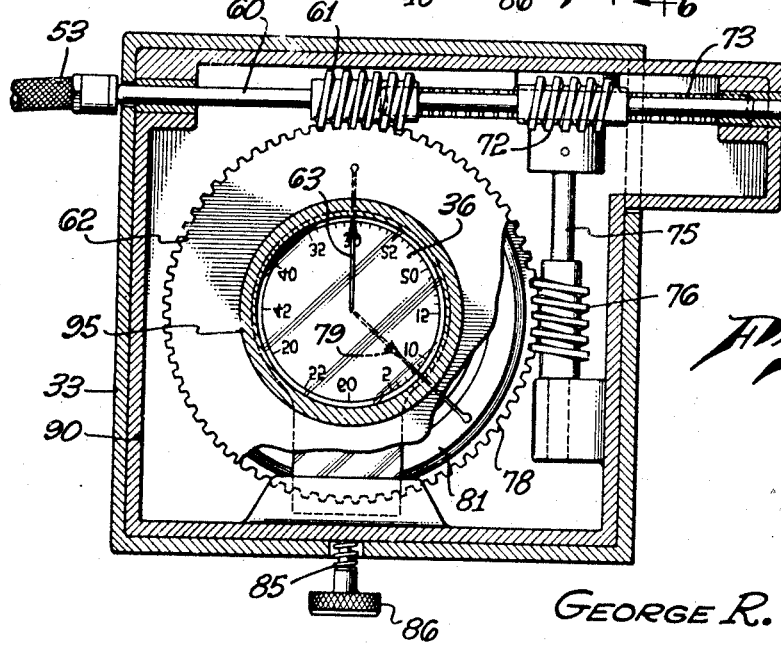
Fig. 6 is a cross-sectional view of a portion of the invention taken along the line 6—6 of Fig. 5.

Referring now to Figs. 5 and 6, the flexible shaft 53 is connected to a shaft 60 upon which is located a worm gear 61. This gear is in mesh with a gear 62 shown in Fig. 6 with a section thereof cut away. Gear 62 drives the "second" hand 63 of the timing mechanism, the hand 63 being connected by an L bracket to a driving ring 65. The ring 65 is held in position and in frictional driving contact with the gear 62 by means of the three brackets 64 and bolt and spring combinations 67 which exert sufficient pressure on the brackets 64 to cause the ring 65 to be rotated by the gear 62. The ring 65 and consequently, the hand 63, may be rotated independently of the gear 62 by the friction wheel 68 when pressed in contact with the beveled edge of the ring 65 against the tension of spring 69 by knurled hand nut 70. This mechanism is for the purpose of resetting the hand 63 either forward or backward to its zero position. A single resetting motor for driving wheel 68 may be used at this position, the mixer stopping the motor when the hand 63 reaches zero position. The gear 62 has 90 teeth and the worm 61 rotates at 90 revolutions per minute. Thus, the gear 62 will make one revolution for every 90 revolutions of the worm 61 and the hand 63 is thus the "second" hand of the timer.

Referring now to the remainder of the clock or timer drive, a second worm 72 is also mounted on shaft 60 and is in mesh with and rotates an intermediate gear 73, the gear 73 being mounted on a shaft 75 carrying a worm 76. The worm 76 is in mesh with a second timing gear 78 shown behind gear 62 in Fig. 6 to drive a minute hand 79 through a frictional ring 81 mounted similarly to ring 65 by three brackets and spring and nut combinations 82. The ring 81 may be adjusted to zero position by a frictional adjusting unit having a friction wheel 84, a spring 85, and hand-nut 86 similar to the assembly 68, 69, and 70 for the ring 65. The minute hand 79 is 60 times slower than the second hand 63 inasmuch as the intermediate gear 73 has 90 teeth, while the gear 78 has 60 teeth. The same speed ratio may also be obtained by providing the gear 73 with 60 teeth and the gear 78 with 90 teeth, similar to the gear 62.

Therefore, since the film is advanced at 90 feet per minute and the shaft 60 makes one revolution per foot, there is thus provided a clock which will indicate the time required for a certain amount of film to pass through the projector. Since the dial 36 is located so that the light from the lamp 34 may be projected under the mirror 30 to the projection lenses 32, the image of the dial and of the hands 63 and 79 will be projected to the screen above the footage indicia as shown at 12 in Fig. 2. As shown in Fig. 5, the entire driving mechanism is contained in an adjustable housing 90 and may be adjusted along the optical axis "0" for focusing the indicia on the dial 36 and the hands 63 and 79 on the screen 7. As mentioned above, this is accomplished by the rack and pinion combination 38—39. The projection lamp and condenser lenses of the timer unit are mounted in housing 91 having air vents therein. The gear 78 is adapted to rotate on the housing being held in position against a flange 93 by an angle 94. The lenses 35 are maintained in position by a threaded collar 92. The gear 62 is adapted to rotate on a bearing 95, which has an annular opening therein for the passage of the light rays emerging through the dial 36. The dial 36 is of thin transparent material to transmit as much light as possible, the numerals being substantially opaque. The hands 63 and 79 are positioned closely adjacent the dial so that their shadows will also be in focus on the observation medium as observed with the light through the dial.

Certain refinements may be added to the mechanism shown above, such as blowers for cooling the projection lamps if exceptionally long throws require high wattage lamps. Also, relays for automatically energizing the lamps when the projector starts, and de-energizing the lamps when the projector stops, may be employed to conserve lamp life. It is further understood that different scales may be used at 36 if desired.

There are other uses for the above mechanism in addition to those mentioned above, such as in the recording of an original sound record wherein a music director desires to know the actual length of time required for the playing of a certain musical sequence, particularly in the case where the recording is made on discs. That is, the timing mechanism may be connected to and operated with the recorder whether disc or film. Also, in rerecording, the director or mixer may desire to know the elapsed length of time of a plurality of sequences in any one reel. This information can instantly be obtained by allowing the clock mechanism to operate only during those sequences, the separate times of each thereby being added. Other uses will occur to those skilled in the art.

I claim as my invention:

1. In a system for projecting film measuring indicia, the combination of a first means for producing light, a second means for producing light, a projection lens, a motion picture projector, a footage counter adapted to be actuated by said projector as motion picture film is advanced therethrough, a clock adapted to be actuated by said projector as motion picture film is advanced therethrough, a screen on which said motion picture film is projected on a portion thereof for observation, means for illuminating said counter with light from said first light producing means, means for projecting light from said second light producing means from said clock and through said projection lens to a second portion of said screen, and means for simultaneously deflecting light from said counter to a third portion of said screen through said projection lens.

2. In a system for projecting film measuring indicia, the combination of means for producing light, a motion picture projector, a footage counter actuated by said projector as motion picture film is advanced therethrough, a screen on a portion of which said motion picture film is projected for observation, means for illuminating said counter with light from said light producing means, means for deflecting light from said counter, a clock mechanism adapted to be driven by said projector and actuated simultaneously with said counter, means for illuminating the indicia of said clock mechanism, and an optical unit for simultaneously projecting light from said clock indicia and light from said counter to said screen.

3. In a system for projecting film measuring indicia, the combination of a light source, a motion picture projector, a footage counter driven through a connection between said footage counter and said projector as motion picture film is advanced through said projector, a screen on a portion of which said motion picture film is projected for observation, means for illuminating said footage counter with light from said source, a clock mechanism driven by a connection between said clock mechanism and the driving connection between said counter driving mechanism and said projector, means for illuminating the indicia of said clock mechanism, an optical unit for simultaneously projecting light from said clock indicia and from said counter to another portion of said screen, and means for connecting and disconnecting the connection to said clock mechanism.

4. A measuring indicia projection system in accordance with claim 3, which includes means for controlling the connecting and disconnecting of said clock mechanism from a point remote from said projector.

5. Apparatus for measuring film footage both in terms of length of film and elapsed time of projection of said film comprising film advancing apparatus, a footage counter, a timing mechanism, a drive shaft connection between said film advancing mechanism and said footage counter for driving said footage counter in synchronism with said film advancing mechanism, a drive shaft connection interconnecting said clock mechanism and said first mentioned drive shaft connection for driving said footage counter, a source of light which illuminates said counter, a source of light for illuminating said timing mechanism, an observation medium, and a common projection unit for projecting light from said counter and from said timing mechanism to said observation medium.

6. Apparatus for projecting continuous film footage measurements and time of projection of said film footage, comprising means for advancing film, said means including a rotating shaft, a footage counter, a drive shaft interconnecting said film advancing shaft and said footage counter for driving said footage counter in synchronism with the advancement of film to indicate the length of film projected at any instant, a clock, a shaft interconnecting said clock and said footage counter drive shaft, a projection lens, a screen, means for deflecting light from said footage counter to said projection lens, and means for projecting light from said clock to said projection lens, the light through said projection lens being projected to said screen.

7. Apparatus in accordance with claim 6, in which said deflection means comprises a mirror positioned above the optical axis of said projection lens and between said clock and said projection lens, and said light projection means for said clock includes a condenser lens, the optical axis of said condenser lens coinciding with the optical axis of said projection lens.

8. Apparatus in accordance with claim 6, in which means are provided for connecting and disconnecting said clock from its drive shaft from a remote point.

9. Apparatus for simultaneously projecting film footage counter indicia and clock indicia to indicate the length of film advanced and the elapsed time of advancement of said film by a film advancing mechanism comprising a projection lens, a clock positioned along the optical axis of said projection lens, a footage counter positioned to one side of the optical axis of said projection lens, a mirror positioned above the optical axis of said projection lens for reflecting light from the indicia of said footage counter to said projection lens simultaneously with the projection of light from said clock to said projection lens, and a medium on which images of said film, of said footage counter, and of said clock are observed simultaneously.

10. A projection system for film footage to indicate the length of film advanced by a film advancing mechanism and the elapsed time of projection comprising a tubular housing with an enlarged central portion, a projection lens at one end of said housing, means for adjusting said lens along its optical axis, a light source at the other end of said housing, a clock adjacent said light source, means for adjusting said light source and clock along the optical axis of said lens, a footage counter at one end of said enlarged central portion of said housing, a second light source above the optical axis of said projection lens and positioned at the other end of said enlarged central portion of said housing, and a mirror intermediate said clock and said objective lens in said enlarged portion for reflecting light from the indicia of said footage counter to said objective lens simultaneously with the projection of light from said clock to said objective lens.

GEORGE R. STEWART.

REFERENCES CITED

The following references are of record in the file of this patent:

UNITED STATES PATENTS

| Number | Name | Date |
| --- | --- | --- |
| 1,924,110 | Dessau | Aug. 29, 1933 |
| 1,747,431 | Ellwood | Feb. 19, 1930 |
| 2,227,201 | Ross | Dec. 31, 1940 |
| 1,579,880 | Meissner et al. | Apr. 6, 1926 |

FOREIGN PATENTS

| Number | Country | Date |
| --- | --- | --- |
| 397,031 | French | Feb. 12, 1909 |
| 613,340 | German | May 17, 1935 |